(12) United States Patent
Cartsonis et al.

(10) Patent No.: US 6,584,501 B1
(45) Date of Patent: Jun. 24, 2003

(54) METHOD TO DISPLAY INFORMATION REPRESENTING NETWORK TRAFFIC ON A COMPUTER DISPLAY MONITOR

(75) Inventors: Michael Cartsonis, Litchfield Park, AZ (US); John Graham-Cumming, Menlo Park, CA (US); Willem A. Koulman, San Francisco, CA (US); Steven J. Schaffer, Foster City, CA (US); Jacob Weil, Palo Alto, CA (US)

(73) Assignee: Compuware Corporation, Farmington Hills, MI (US)

( * ) Notice: Subject to any disclaimer, the term of this patent is extended or adjusted under 35 U.S.C. 154(b) by 0 days.

(21) Appl. No.: 09/244,274

(22) Filed: Feb. 3, 1999

(51) Int. Cl.[7] .............................................. G06F 15/173
(52) U.S. Cl. ........................ 709/224; 709/223; 370/233; 370/234
(58) Field of Search .................................. 709/223, 224; 370/233, 234, 241–245, 250–254

(56) References Cited

U.S. PATENT DOCUMENTS

| | | | | | |
|---|---|---|---|---|---|
| 5,740,355 | A | * | 4/1998 | Watanabe et al. | 714/45 |
| 5,787,253 | A | * | 7/1998 | McCreery et al. | 9/202 |
| 5,802,302 | A | * | 9/1998 | Waclawsky et al. | 709/224 |
| 5,862,335 | A | * | 1/1999 | Welch, Jr. et al. | 395/200.54 |
| 5,946,302 | A | * | 8/1999 | Waclawsky et al. | 370/252 |
| 6,182,146 | B1 | * | 1/2001 | Graham-Cumming, Jr. | 709/238 |
| 6,219,050 | B1 | * | 4/2001 | Schaffer | 345/340 |
| 6,233,256 | B1 | * | 5/2001 | Dieterich et al. | 370/506 |
| 6,240,452 | B1 | * | 5/2001 | Welch, Jr. | 709/224 |

* cited by examiner

*Primary Examiner*—Saleh Najjar
(74) *Attorney, Agent, or Firm*—Blakely, Sokoloff, Taylor & Zafman LLP

(57) ABSTRACT

A user interface and computer-implemented method for analyzing and displaying network traffic performance assessment data in a computer network. Packet trace data is organized into application-level threads for display in a visual thread diagram. The user can manipulate the visual thread diagram to configure it in a number of ways in a dynamic manner.

27 Claims, 8 Drawing Sheets

METHOD TO DISPLAY INFORMATION REPRESENTING NETWORK TRAFFIC ON A COMPUTER DISPLAY MONITOR

BACKGROUND OF THE INVENTION

1. Field of the Invention

The present invention relates generally to tools for network performance and protocol analysis, and more specifically to a user interface and method for visually displaying information about packet traces in a network environment, using thread diagrams.

2. Description of Background Art

Conventional network protocol analysis tools, such as Sniffer Basic by Network Associates, Inc. (www.nai.com), evaluate network performance with respect to the transfer of individual packets across network connections. For example, packet transfer times can be measured and aggregated into a performance metric. Such analysis is generally able to provide detailed information regarding a network protocol at the packet level.

However, in many situations, analysis of application-level behavior is desired. For example, one may wish to analyze the behavior of an application such as a web browser, which makes use of a network protocol, in order to determine whether the performance of the application is satisfactory, and to diagnose problems in application-level behavior.

Application-level behavior can be extracted from packet-level analysis by pruning a protocol analyzer trace to determine the application level information that is of interest. Information relevant to a particular transaction or communication must be extracted and synthesized from the packet-level data. Such a technique is time-consuming and often yields inaccurate results.

In addition, such a technique fails to provide any easy-to-use graphical user interface for viewing application-level protocol analysis data. Thus, the technique fails to provide the viewer of the output with the necessary information, presented in a coherent manner, for diagnosing and solving network protocol deficiencies and problems.

What is needed is a method and user interface for displaying network performance and protocol analysis results in a coherent and visually understandable manner. What is further needed is a method and user interface for accurately providing application-level protocol analysis without requiring time-consuming analysis of packet-level trace information.

SUMMARY OF THE INVENTION

The present invention overcomes the limitations of conventional network analyzer software products by providing a user interface and computer-implemented method that employs graphical techniques to enable the user to quickly identify performance problems in network traffic and application behavior, including parallelism faults, timing gaps, and the like.

The user interface of the present invention operates as part of a network analyzer software product coupled to a network having a plurality of nodes. The nodes transmit packets of data between them, which packets are monitored by the network analyzer. The user interface comprises a time axis listing a plurality of times. These times may be listed in any useful time format, whether absolute or relative time (with respect to some arbitrary starting time). The user interface further includes a plurality of thread names listed along a second axis that is perpendicular to the time axis. Each thread name is associated with a thread, which includes at least one sequence of packets transmitted between two or more nodes and forming a discrete transaction between the nodes. The present invention determines which packets belong in a particular thread by analyzing the stream of packets and making a protocol-specific determination of the packets that should be grouped together.

In general, a transaction consists of an application-level communication between two nodes. Thus, a request by one node for a file stored at a second node, and the subsequent delivery of the requested file, can be considered a single transaction, and can therefore be represented as a single thread. More specifically, in the Hypertext Transfer Protocol (HTTP), a GET request by a client browser and the delivery of the requested web page together form a single thread, even though there are at least two discrete sequences of packets. The sequence of packets that makes up a thread need not be contiguous, as a single node may participate in several different threads at the same time. For example, a server node may be serving numerous different client nodes at the same time, and thus have a distinct thread occurring with each of the clients, with the packets being serially transmitted and received by the server node belonging to these many different threads.

The plurality of thread names are listed according to a sequence of threads between the nodes of the network. Each thread name is further associated with a thread graphic in the user interface. Each thread graphic begins at the time of a first packet in the associated thread and extends parallel to the time axis to the time of a last packet in the associated thread. The thread graphic thus shows the overall duration of the associated thread, along with its starting and ending times. A thread graphic may be color-coded with respect to various quantitative measures, such as its total size, average packet size, number of packets, number of bytes, and so forth, or qualitative aspects, such as protocol type. Color-coding, or other distinctive visual features, may also be provided for other relevant quantitative values or qualitative characteristics of the thread.

Since several thread names are listed, and each one has its associated thread graphic showing its duration and its beginning and end, the user can readily see when one thread ends or begins with respect to any other thread. This makes it very simple to identify parallelism faults, where multiple different threads are occurring concurrently between the same two nodes, or gaps between the end of one thread and the beginning of another (indicating a loss of optimum bandwidth utilization). These types of problems degrade network or application performance, and their diagnosis can be vital to improving application operation.

In addition, the user interface of the present invention makes clear the interdependence among different parts of a networked application, and facilitates thread grouping in an interactive, dynamic manner. The user is also able to quickly narrow down an area of interest by zooming.

The present invention thus facilitates analysis of packet-level operational characteristics in a packet trace that groups packets in coherent, application-level structure.

A method in accordance with the present invention includes receiving a plurality of packets on networks, identifying in the packets a plurality of threads between pairs of nodes on the network, displaying a time axis including a plurality of times, listing the names of the threads in perpendicular to the time axis, and then for each thread name, displaying a thread graphic beginning, with respect to the time axis, at a time of a first packet in the sequence of packets of the thread, and ending at the time of a last packet in the sequence of packets. The method may also implement thread grouping as specified by the user.

DETAILED DESCRIPTION OF THE PREFERRED EMBODIMENTS

Figure 1:
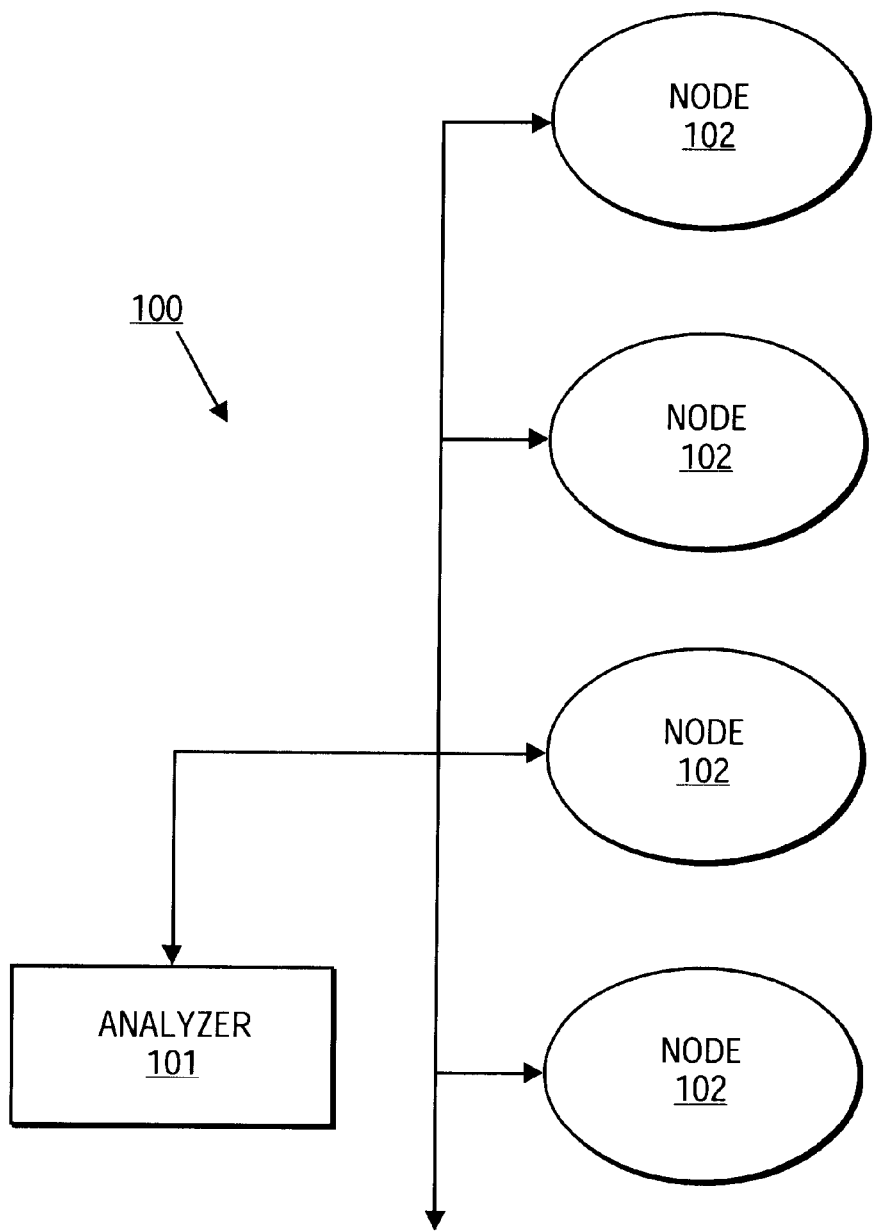
FIG. 1 is a diagram of a network to be analyzed in connection with the present invention.

Referring now to FIG. 1, there is shown a network 100 to be analyzed in connection with the present invention. Network 100 contains a number of interconnected nodes 102, which may be servers, clients, routers, and other networked components. The topology shown in FIG. 1 is merely exemplary; network connections may be arranged according to any other scheme, depending on the configuration and requirements of the particular network. Connections among nodes 102 are established by well-known protocols such as Transfer Control Protocol/Internet Protocol (TCP/IP) along conventional physical connection media such as an Ethernet, T1, or T3 line. Analyzer 101 is a device, typically implemented as software on a conventional computer connected to network 100, for measuring performance characteristics, such as timing, of the network and its connections.

The present invention is described herein in terms of a user interface and computer-implemented method for presenting information obtained by analyzer 101 in measuring network characteristics. As such, it is presented as a software application running on a conventional computer, such as that represented by analyzer 101. Such computer is for example, a conventional computer with a Pentium II microprocessor, random access memory (RAM), input and output devices, and storage. It runs an operating system, such as Windows 95 from Microsoft Corporation. The user interface of the invention may be presented on a conventional display device such as a cathode ray tube (CRT), as is known in the art. The user may interact with the user interface of the invention using a conventional pointing device such as a trackball or mouse, and a keyboard, if desired.

Figure 2:
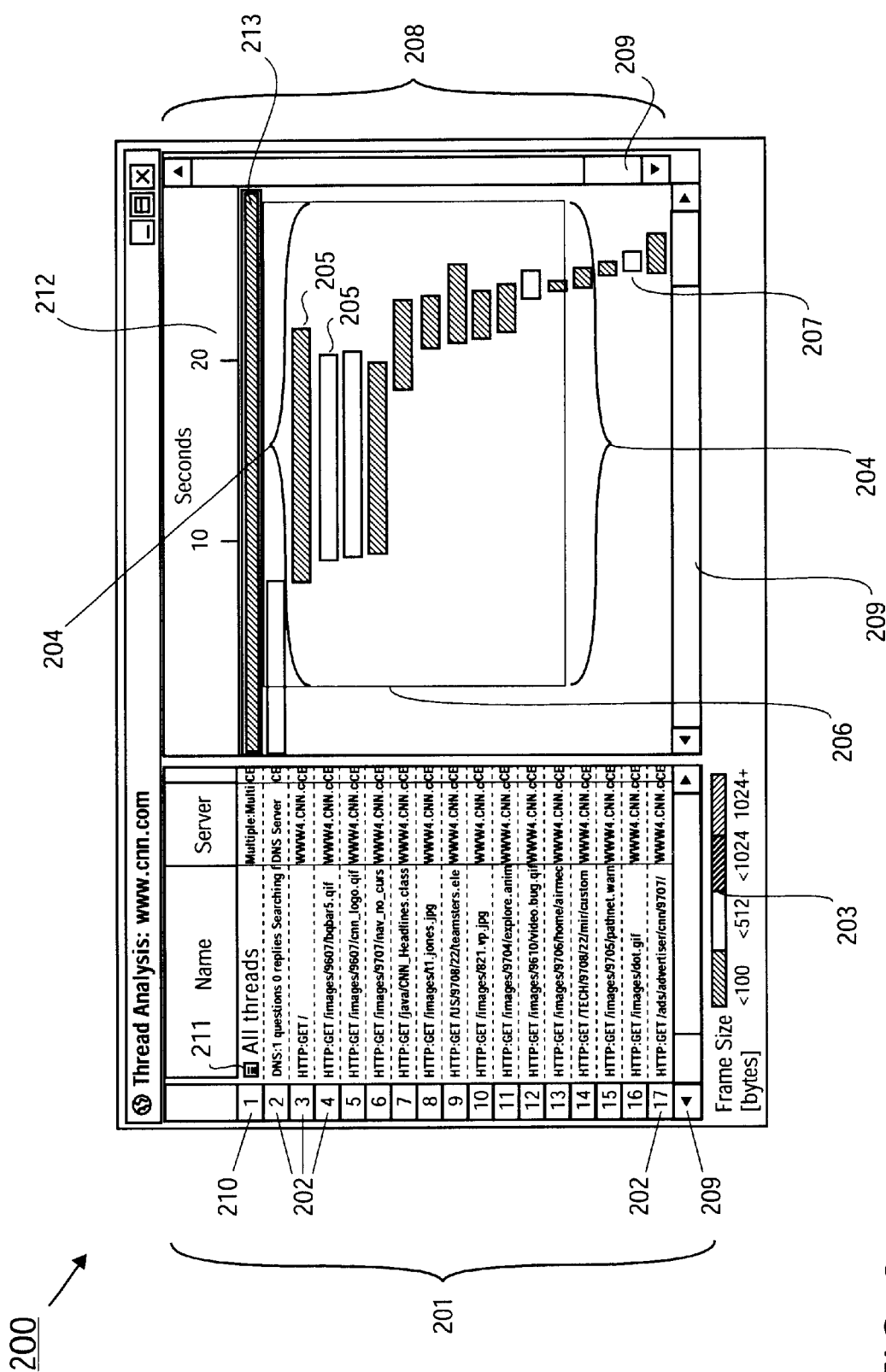
FIG. 2 is a screen shot of a visual thread diagram according to the present invention.

Referring now to FIG. 2, there is shown a screen shot of a visual thread diagram 200 according to one embodiment of the present invention. As with all screen shots described herein, the diagram 200 presented in FIG. 2 can be displayed on a display screen of a computer for analyzing the performance of network 100. The user can interact with the various components displaying in the screen shot by using a pointing device to manipulate an on-screen cursor (not shown).

Visual thread diagram 200 presents information in terms of threads, with each thread representing a series of packet transfers. Information describing threads is shown in a manner that allows the user to explore the length of time, or duration, of a thread, the content of the thread, the start and stop times of the thread, and the network resources involved in processing the thread.

A thread is defined as some collection of individual packets that relate to a particular transaction or other application-level event. The present invention determines which packets belong in a particular thread by analyzing the stream of packets and making a protocol-specific determination of the packets that should be grouped together.

Figure 8:
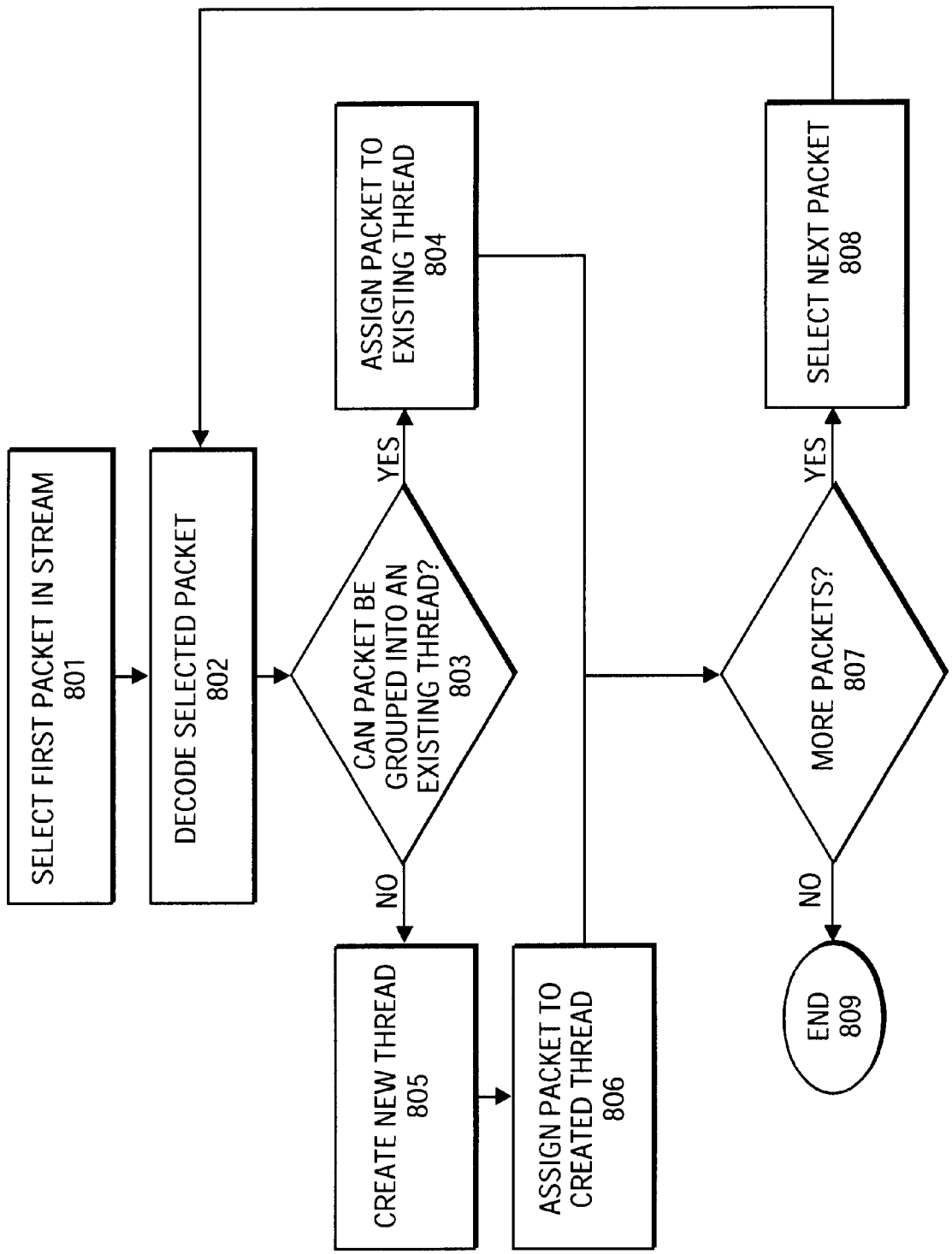
FIG. 8 is a flow diagram showing a method of determining which packets belong in a particular thread.

Referring now to FIG. 8, there is shown an example of a method for performing this analysis. A first packet is selected 801 and decoded 802. The system then determines 803 whether the selected packet can be grouped into an existing thread. This test is protocol-specific, and is generally based on the particular types of packets associated with the application being analyzed. For example, in the HTTP protocol, there are two particular types of packets that will not be grouped into an existing thread because they indicate the beginning of a new thread: 1) the first packet in a new TCP connection; or 2) a packet that contains a GET or POST command. Depending on the particular protocol being used, different rules and conditions apply in implementing the test of 803.

If the packet can be grouped into an existing thread, the packet is assigned 804 to that thread. If not, a new thread is created 805 and the packet is assigned 806 to it. The system then determines 807 whether there are any additional packets to be analyzed. If so, it selects 808 another packet and returns to 802. If not, the algorithm ends 809.

Alternatively, other ways of determining or defining threads can be used. In an alternative embodiment, a specific programming language for writing protocol decodes and thread recognition can be made available, so as to provide greater configurability in this regard.

Each thread has a number of characteristics, including for example: a name; a start time, which can be expressed either in absolute terms or in relative terms (with respect to the beginning of the appropriate packet trace); a duration; a source and destination node; average packet size; number of packets; number of bytes; and the like. Visual thread diagram 200 provides a graphical display of some or all of these characteristics in a manner that is recognizable and understood by the user. Thread names are automatically generated based on the nature of the underlying network operation represented by the thread; however, the user can rename threads if desired, by simply double-clicking on the cell containing the name and typing a new name. In one embodiment, a pop-up menu is provided, which allows selection from a list of names.

Visual thread diagram 200 contains two panes 201 and 208. Within each pane, scroll bars 209 provide navigation controls in a conventional manner. The vertical scroll bar 209 controls vertical scrolling for both panes 201 and 208, so that each element in pane 201 remains in alignment with the corresponding element in pane 208. The center line between the two panes 201 and 208 can be moved left or right by the user, using an on-screen cursor (not shown), to resize panes 201 and 208 as desired.

Pane 201 shows a table listing a number of threads 202 in a columnar format. For each thread 202, various types of information are provided, including any or all of the items listed previously. In one embodiment, the specific types of information shown in pane 201 can be configured by the user. In the example of FIG. 2, sixteen threads 202

(numbered 2 through 17) are shown in pane 201, and for each thread 202 the name of the thread, and an associated server, are displayed.

Pane 208 contains a visual representation of threads 202, known as a "Gantt chart". Gantt charts are described for example in "Microsoft Project 98: Step by Step", Microsoft Press, November 1997. An example of a computer-implemented instantiation of a Gantt chart can be found in Microsoft Project 98, from Microsoft Corporation. In the present invention, a horizontal bar 205 is shown for each thread 202 displayed in pane 201. Each bar 205 is positioned so that it is aligned with the corresponding thread 202 information in pane 201. The start and end position of each bar 205 is representative of the starting and ending time for the corresponding thread 202, with reference to time axis 212. Thus, the width of each bar 205 represents the duration of the thread.

In one embodiment, the user can define groups of threads. Threads belonging to a particular group are shown below the group title, and indented with respect to the group title. For example, FIG. 2 shows group title 210, labeled "All threads", which represents an aggregate of threads 202 listed below it. A bar 213 for the thread group is shown in pane 208, with visual characteristics representative of the relevant information for the group as a whole. The user can expand or collapse such groups of threads by manipulating icons 211 as desired, so as to selectively view a higher-level representation of network activity in both panes 201 and 208. The collapsing and expanding operations are performed by activating a small icon 211 in a manner that is familiar to Windows 95 users for collapsing and expanding hierarchical displays. The user can also reorganize thread groups as desired, by dragging rows representing threads 202 or thread groups from a position within (subordinate to) one group to a position within another group. Groups within groups can also be created. Moving a thread group automatically causes all its subsidiary items to move along with it.

In one embodiment, bars 205 are color-coded to show average packet size for each thread, keyed to legend 203. Other types of information can also be displayed using color-coding, as will be recognized by one skilled in the art.

As stated above, scroll bars 209 operate in both panes 201 and 208 of the diagram 200. The user can manipulate the vertical scroll bars 209 to change the display of both panes 201 and 208 in a coordinated manner, with each bar 205 remaining in alignment with the corresponding entry in the table of pane 201. Thus, the user can relate the information in the table of pane 201 with the graphical view of pane 208.

The default root of the hierarchy displayed in pane 201 is the "All Threads" group 210. Initially, in one embodiment, threads 202 are sorted within any particular group by start time, from top to bottom. Thus, within a group, the earliest thread is shown at the top and the latest is shown at the bottom. In other embodiments, a different sort order may be used. The user can specify a desired sort order by double-clicking on any column heading. For example, if the user double-clicks on the "Server" column heading, the display of threads is re-ordered to be in alphabetical order by server name. If a group contains both groups and threads, its child groups appear first, followed by its child threads. Other methods for specifying a sort order can also be employed, as will be recognized by one skilled in the art.

The information presented in diagram 200 is derived from measurements of network performance. Such measurements, including statistics concerning packet transfers, data rates, and the like, are obtained by methods that are well known in the art of network performance assessment. Many existing network environments provide log files from which such measurements can be extracted for use in the present invention.

Figure 5:
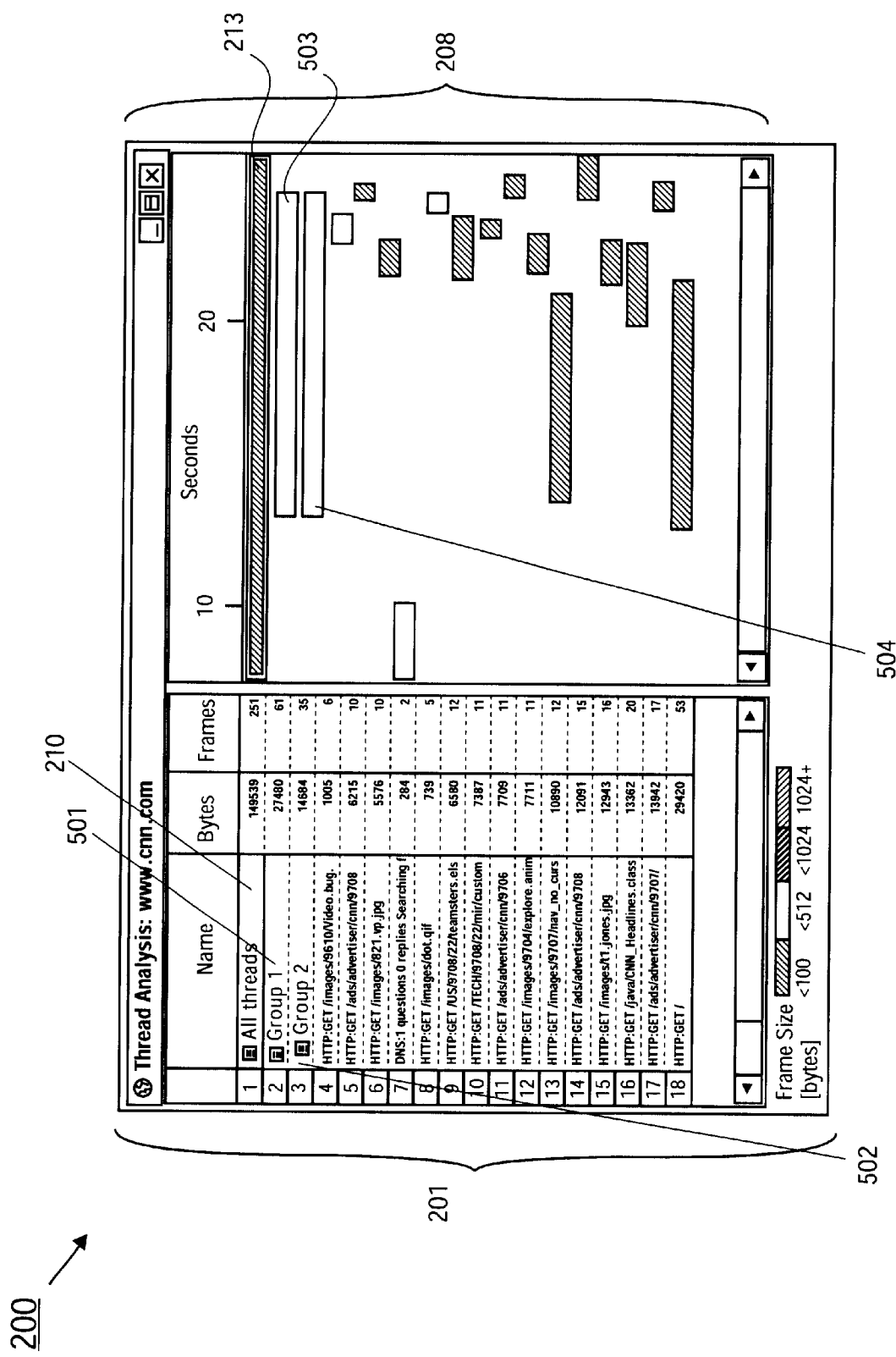
FIG. 5 is a screen shot of a visual thread diagram showing a view of a thread group.

Referring now to FIG. 5, there is shown an example of diagram 200 employing a more complex grouping structure. Group 210 (labeled "All threads") includes all items listed in pane 201. Group 501 (labeled "Group 1") includes items listed underneath the group's title and indented with respect to the title. Group 502 (labeled "Group 2") includes three threads. Note that Group 501 includes Group 502, as well as a number of other threads.

The user defines a thread group by selecting one or more items (including threads and/or groups) using an on-screen cursor, and activating a "Group" command from a pop-up menu or keyboard command. A new group is created containing the selected items. A temporary name (such as "Unnamed") is assigned to the group, subject to replacement by the user. The group is placed in the same location in the hierarchy of groups as were the individual items contained in the group. If some of the items of the group are themselves groups, the new thread group is placed in the hierarchy as a child of the parent of one those groups.

Quantitative information shown in the table of pane 201, describing byte and frame count and the like, is provided for groups. This information represents an aggregate for all items contained within the group. Depending on the nature of the particular data element, the aggregate may represent a minimum, maximum, average, sum, or some other computation based on the values for individual threads within the group. In some cases, a value is shown if there is only one value among all the threads in the group, and the word "Multiple" is shown if there is more than one (for example, if all the threads have the same protocol, the name of the protocol is displayed, but if more than one protocol is present within the group, the word "Multiple" is displayed). The information is dynamically updated whenever the group structure is reorganized by the user.

The grouping structure is also reflected in pane 208 of FIG. 5. Bar 503 shows, in a graphical form, thread information for Group 501 as a whole. Bar 504 shows thread information for Group 502 as a whole. In this way, the user can see visual representations of thread groups, in any organizational scheme desired.

Thread groups can be ungrouped. The thread group is removed and all items contained therein become children of the original thread group's parent.

Thread groups can be renamed by the user if desired, by double-clicking on the name of the group and typing a new name. As described above for thread names, a pop-up menu may also be provided.

Figure 7:
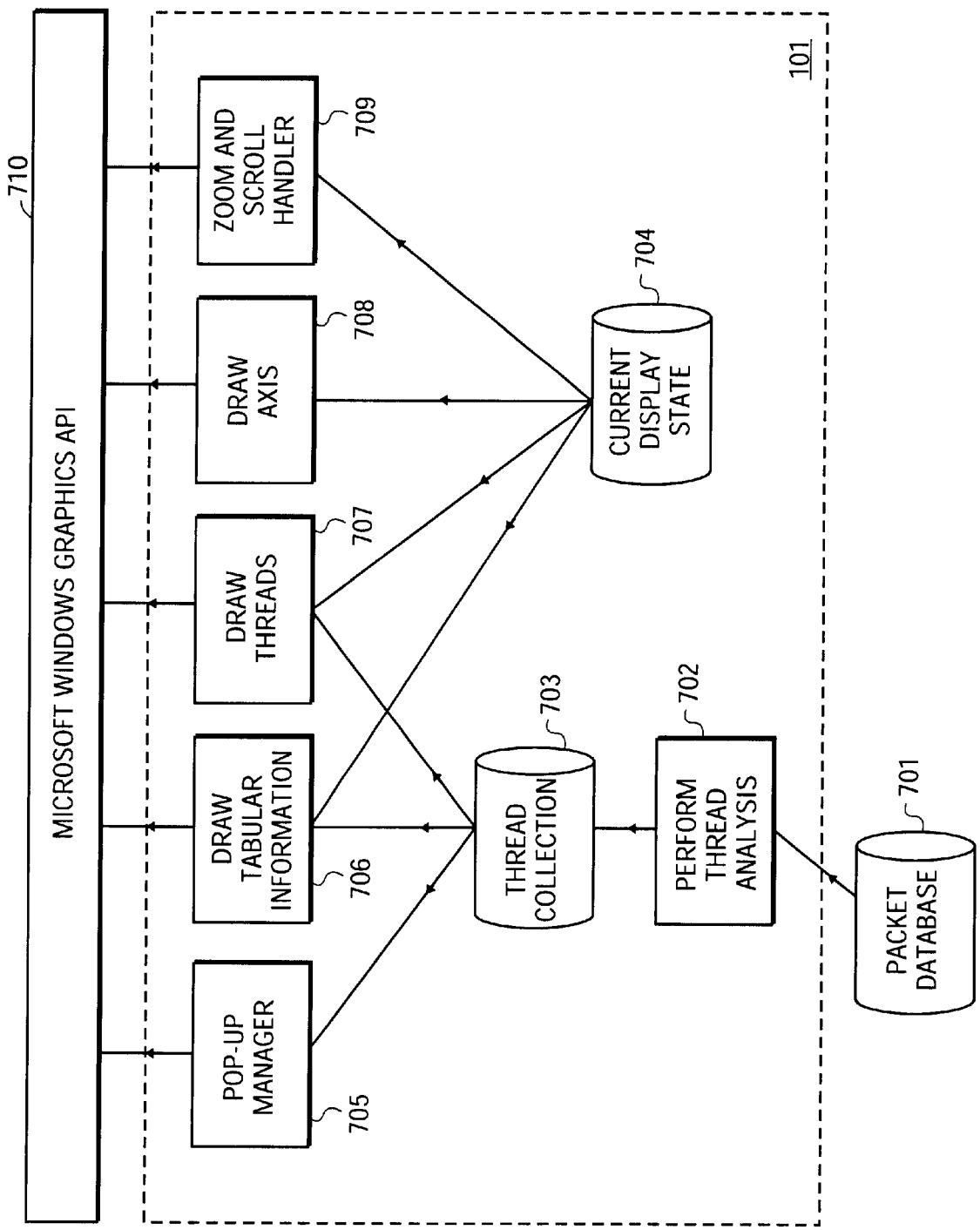
FIG. 7 is a block diagram of the software architecture of one embodiment of the present invention.

Referring now to FIG. 7, there is shown a block diagram of the software architecture that is used to generate visual thread diagram 200 according to one embodiment of the present invention. Analyzer 101 employs software which performs thread analysis 702 on a source of packets such as packet database 701. This thread analysis 702 creates a thread collection 703 with characteristics that form the base information for visual thread diagram 200. Thread collection 703 stores information describing thread name, source and destination nodes, packets, bytes, start times, durations, and the like.

Thread analysis 702 includes performing conventional protocol decoding techniques, and then examining individual packets to determine which packets constitute a thread, as defined in relation to a specific application being analyzed. For each application, threads are defined as some significant application-level type of event that occurs in the course of the application. For example, in the World Wide Web environment, the signification application-level type of event could be considered the execution of a GET command.

Thread analysis 702 further includes recording information about any subsequent packets belonging to the identified thread. This is done for each source/destination node pair seen in the packet trace obtained from packet database 701.

A number of graphics routines and processes 705–709 are employed to generate diagram 200 from thread collection 703. The current state of the screen display is stored in 704, and this information is also used by the graphics routines. Pop-up manager 705 controls display of pop-up information as described below in connection with FIG. 4. Draw tabular information module 706 performs the graphics functions involved in generating the table in pane 201 of the display. Draw threads module 707 performs the graphics functions involved in drawing bars 205 representing threads. Draw axis module 708 performs the graphics functions involved in drawing the time axis 212. Zoom and scroll handler 709 implements the interactive zooming and scrolling functions. Many of these graphics routines utilize standard graphics application programming interfaces (APIs) 710 as may be provided with the native operating system, such as Windows 95.

Referring again to FIG. 2, in one embodiment, the user is able to zoom in on selected portions of diagram 200. This is done by drawing a rectangle 206 using an on-screen cursor, to define a zoom area 204 including some portion of pane 208. The user then activates a command (such as releasing a mouse button) and the area defined by the left and right borders of rectangle 206 is expanded to fill pane 208. In one embodiment, this zooming operation does not affect the vertical axis, so that bars 207 would still appear in the zoomed display even though they lie outside the rectangle 206.

Figure 3:
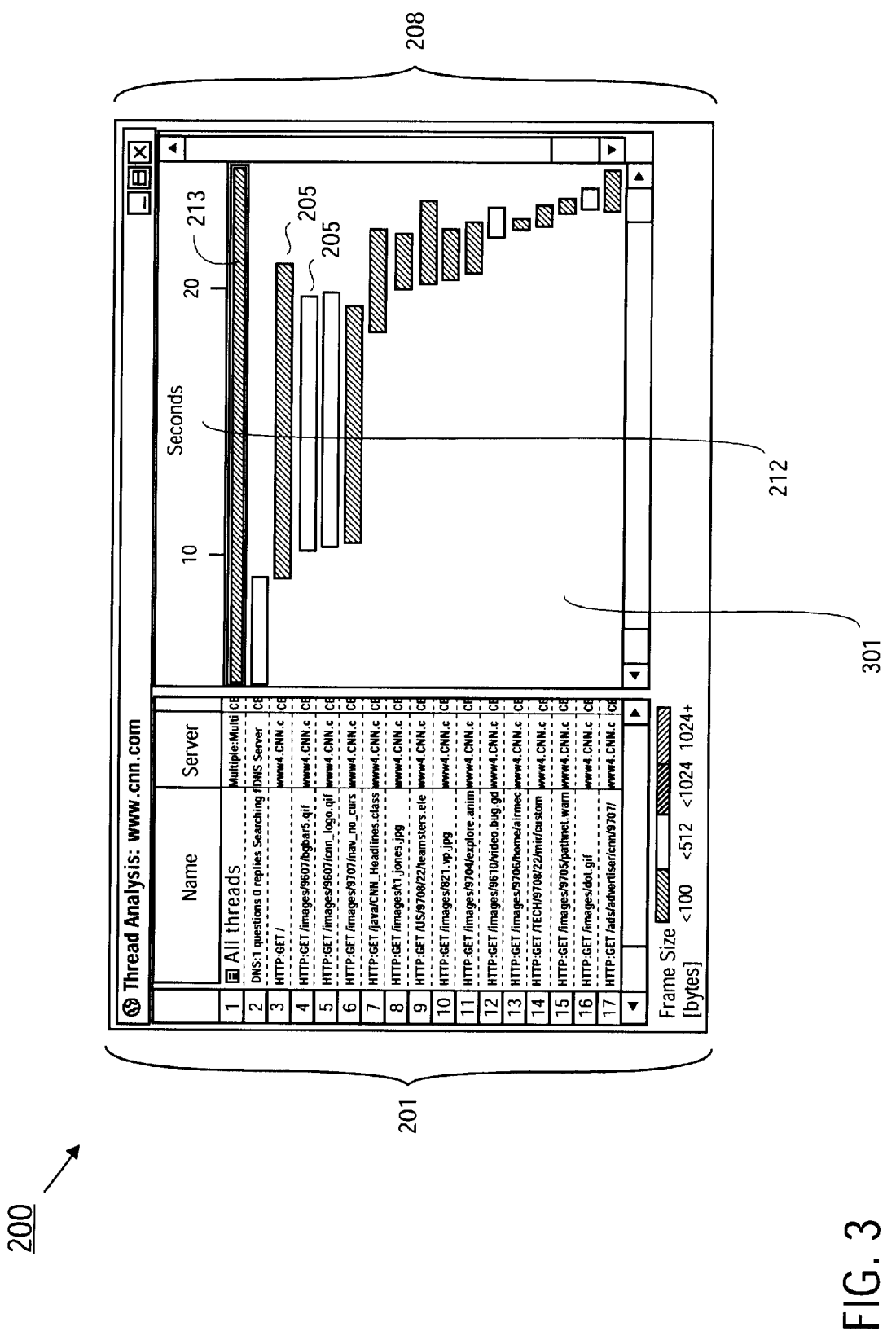
FIG. 3 is a screen shot of a zoomed visual thread diagram.

Referring now to FIG. 3, there is shown a screen shot of visual thread diagram 200 after the zooming operation has been completed. Pane 201 is unchanged, but pane 208 has been updated to reflect the zooming operation. Specifically, time axis 212 now shows a range of time specified by the rectangle 206 drawn by the user in FIG. 2. Bars 205 and 213 are updated in accordance with the new time axis 212. In this embodiment, the vertical organization of diagram 200 remains unchanged, so that the same number of threads is shown as in FIG. 2, and the rows of pane 201 and bars of pane 208 retain the same vertical height as in FIG. 2.

By providing the zooming feature illustrated in FIGS. 2 and 3, the present invention allows the user to focus on particular ranges of time that are of interest, and to see more detailed graphical representations of selected portions of diagram 200.

Figure 4:
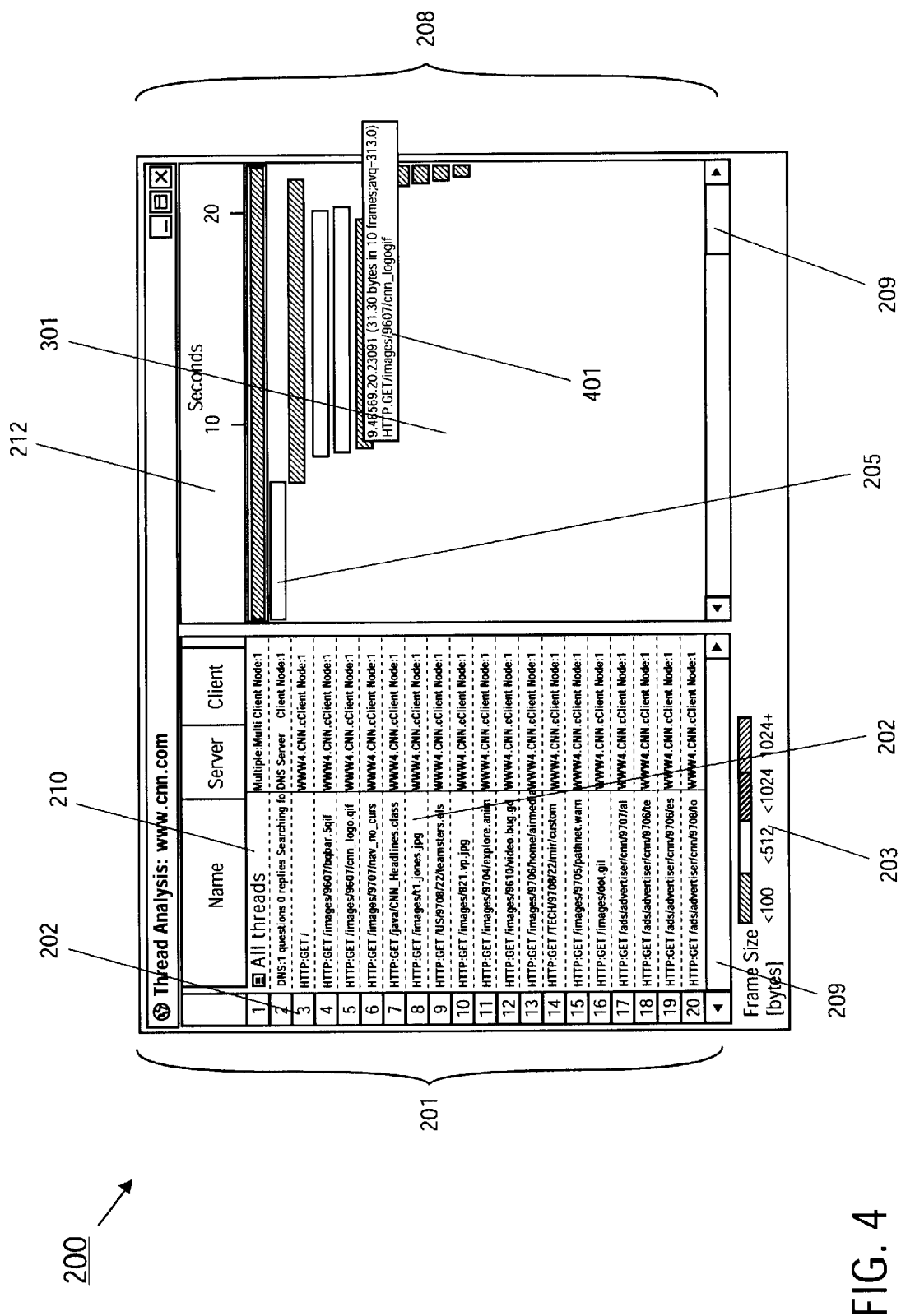
FIG. 4 is a screen shot of a visual thread diagram showing pop-up information.

Referring now to FIG. 4, there is shown a screen shot of visual thread diagram 200 with pop-up information 401 for a thread. In one embodiment, such pop-up information 401 appears when the user positions an on-screen cursor (not shown) over a bar 205 in pane 208 for a specified length of time. In another embodiment, pop-up information 401 appears when the user positions the cursor over a thread 202 in pane 201. Pop-up information 401 includes detailed information describing the corresponding thread, including for example the name of the thread, start time, duration, number of bytes, number of packets, and average packet size. In one embodiment, the user may configure the system to specify what kind of information is displayed as pop-up information 401.

The pop-up feature described and illustrated in FIG. 4 allows a user to obtain detailed information for any thread in a quick and easy manner, even if such information is not currently displayed in pane 201. This is particularly useful if pane 201 is implemented as a resizable window pane, so that in certain configurations of the window pane, the user may not be able to see the entire description of a particular thread in pane 201.

Figure 6:
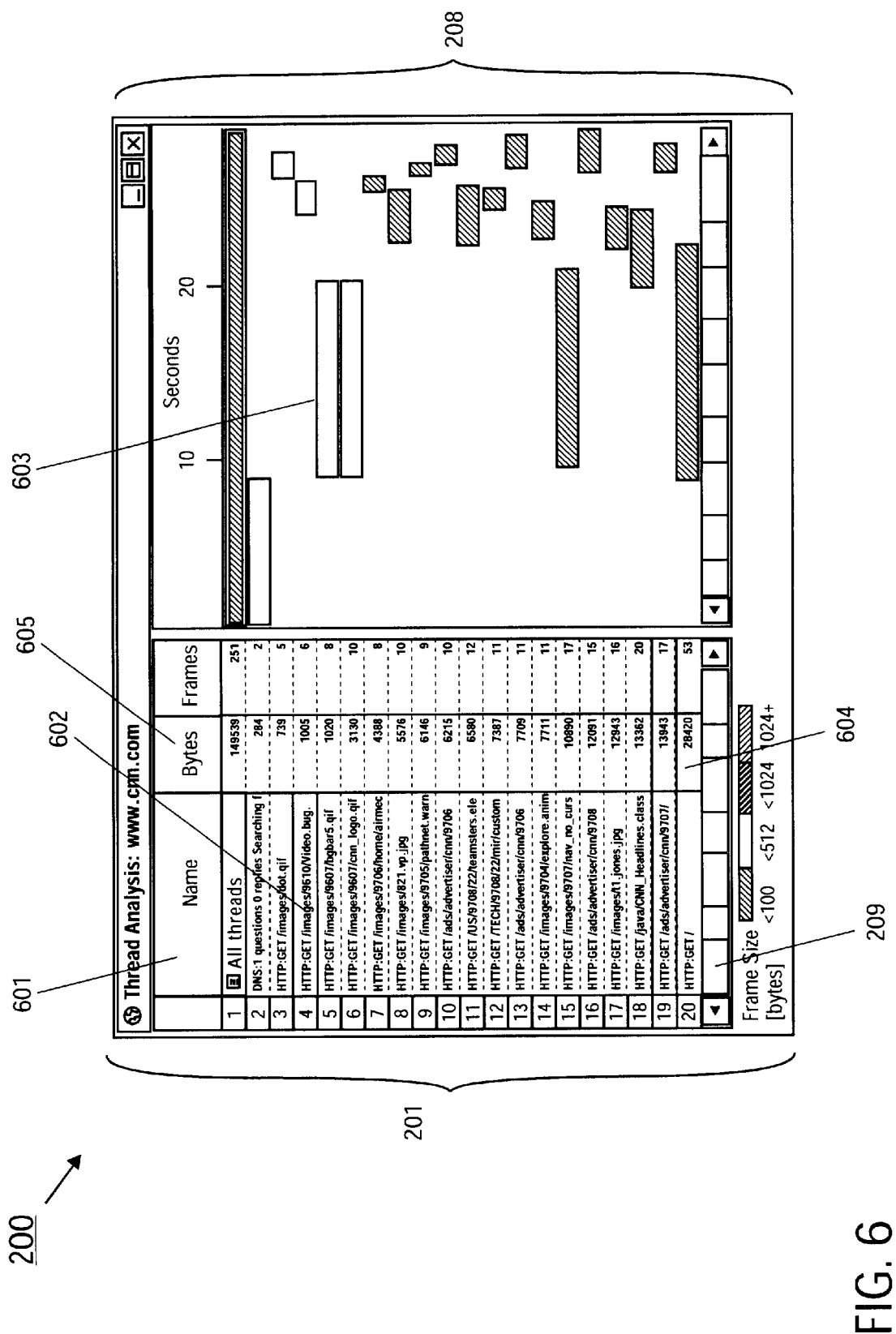
FIG. 6 is a screen shot of a visual thread diagram showing selecting and sorting operations.

Referring now to FIG. 6, there is shown an example of selecting and sorting operations. When a thread 602 is selected by the user in the table of pane 201 (using an on-screen cursor), it is highlighted using a black border. The corresponding bar 603 in pane 208 is also highlighted. In one embodiment, the user can select bar 603 using the cursor, and the corresponding thread 602 in the pane 201 is highlighted. In addition, FIG. 6 shows an alternative sort order, wherein the user has double-clicked on the header of the Bytes column 605, so that the threads are now sorted by number of bytes. Byte values 604 confirm this order. Similarly, the user could double-click on the header of the Name column 601 to see threads sorted by name. Other mechanisms for changing the sort order for the table of pane 201 may also be provided.

From the above description, it will be apparent that the invention disclosed herein provides a novel and advantageous user interface and method for visually displaying information about packet traces in a network environment, using thread diagrams. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A user interface of a computer system for analyzing network traffic in a computer network having a plurality of nodes, the user interface comprising:

a time axis listing a plurality of times; and a plurality of thread graphics, each thread graphic associated with a thread comprising a group of packets transmitted between two nodes, each packet having a time, each thread graphic extending from a position representing a first time of a first packet in the associated thread to a position representing a second time of a last packet in the associated thread, wherein a first thread graphic of a plurality of thread graphics represents a first group of packets that form a first discrete transaction between the two nodes and wherein the first discrete transaction is a first application-level communication between the two nodes.

2. The user interface of claim 1, wherein each thread graphic extends in a direction parallel to the time axis.

3. The user interface of claim 1, further comprising:

a plurality of thread names listed along a second axis perpendicular to the time axis, each thread name associated with one of the threads;

and wherein:

the plurality of thread names is listed according to a sequence; and the plurality of thread graphics is displayed according to the sequence of thread names.

4. The user interface of claim 3, wherein the sequence of thread names is user-selectable.

5. The user interface of claim 1, wherein each thread graphic has a color indicative of an amount of data in the associated thread.

6. The user interface of claim 1, wherein each thread graphic has a color indicative of a total number of packets in the associated thread.

7. The user interface of claim 1, wherein each thread graphic has a color indicative of a characteristic of the associated thread.

8. The user interface of claim 1, wherein responsive to user selection of one of the plurality of thread graphics, the user interface displays additional information describing the associated thread.

9. The user interface of claim 1, further comprising at least one thread group graphic associated with a thread group comprising a plurality of threads, the at least one thread group graphic extending from a position representing a time of a first packet of a first thread in the associated thread group to a position representing a time of a last packet in a last thread in the associated thread group.

10. The user interface of claim 9, wherein contents of each thread group graphic are user-selectable.

11. The user interface of claim 1, wherein the first group of packets is collected from a stream of packets.

12. The user interface of claim 11, wherein the stream of packets includes a second group of packets.

13. The user interface of claim 12, including identifying the first group of packets that form the first discrete transaction by making a protocol-specific determination.

14. The user interface of claim 13, wherein the protocol-specific determination includes an event type.

15. The user interface of claim 1, wherein the first group of packets is determined by user-definable criteria.

16. A user interface of a computer system for analyzing network traffic in a computer network having a plurality of nodes, the user interface comprising:
   a time axis listing a plurality of times, each in a position;
   a plurality of thread names listed according to a sequence, in an arrangement perpendicular to the time axis, each thread name associated with a thread comprising at least one group of packets transmitted between two nodes and forming a discrete transaction between the two nodes, each packet having a time, wherein each discrete transaction is an application-level communication between the two nodes; and
   each thread name associated with a thread graphic displayed in alignment with the thread name, and beginning in a first position corresponding to a position on the time axis representing a first time of a first packet in the associated thread and extending parallel to the time axis to a second position corresponding to a position on the time axis representing a second time of a last packet in the associated thread.

17. A computer-implemented method of displaying on a computer display monitor information representing network traffic on a network including a plurality of nodes, the method comprising:
   receiving packet trace data for a plurality of packets transmitted among nodes of the network;
   extracting from the packet trace data a plurality of threads, each thread comprising at least one group of packets transmitted between two nodes;
   displaying a time axis listing a plurality of times; and
   displaying, for each thread, a thread graphic extending from a position representing a first time of a first packet in the thread to a position representing a second time of a last packet in the thread, wherein the at least one group of packets forms a discrete transaction between the two nodes, and wherein the discrete transaction is an application-level communication between the two nodes.

18. The method of claim 17 including identifying the first group of packets that form the first discrete transaction by making a protocol-specific determination.

19. The method of claim 17, wherein each thread graphic extends in a direction parallel to the time axis, the method further comprising:
   displaying according to a sequence, a plurality of thread names listed along a second axis perpendicular to the time axis, each thread name associated with one of the plurality of threads; and
   displaying the plurality of thread graphics according to the sequence of thread names.

20. The method of claim 19, including accepting user selection of a sequence for thread name display.

21. The method of claim 17, including displaying each thread graphic with a color indicative of a total amount of data in the associated thread.

22. The method of claim 17, including displaying each thread graphic with a color indicative of a total number of packets in the associated thread.

23. The method of claim 17, including displaying each thread graphic with a color indicative of a characteristic of the associated thread.

24. The method of claim 17, further comprising:
   responsive to user selection of one of the thread graphics, displaying additional information describing the associated thread.

25. The method of claim 17, further comprising:
   displaying at least one thread group graphic associated with a thread group comprising a plurality of threads, the at least one thread group graphic extending from a position representing a time of a first packet of a first thread in the associated thread group to a position representing a time of a last packet in a last thread in the associated thread group.

26. The user interface of claim 25, further comprising accepting user definition of the thread group as including a user-selected group of threads.

27. A computer-implemented method of displaying on a computer display monitor information representing network traffic on a network including a plurality of nodes, the method comprising:
   receiving packet trace data for a plurality of packets transmitted among nodes of the network;
   organizing the packet trace data into a plurality of packets transmitted among nodes of the network;
   displaying a time axis listing a plurality of times spaced apart, each in a position; and
   displaying a plurality of thread names listed according to a sequence, in an arrangement perpendicular to the time axis, each thread name associated with a thread comprising at least one group of packets transmitted between two nodes and forming a discrete transaction between the two nodes, each packet having a time, wherein the discrete transaction is an application-level communication between two nodes,
   wherein each thread name is associated with a thread graphic displayed in alignment with the thread name, and beginning in a first position corresponding to a position on the time axis representing a first time of a first packet in the associated thread and extending parallel to the time axis to a second position corresponding to a position on the time axis representing a second time of a last packet in the associated thread.

* * * * *